F. K. STEHLE AND C. A. KEFFER.
PISTON RING.
APPLICATION FILED JUNE 11, 1920.

1,353,082.

Patented Sept. 14, 1920.

INVENTORS
Frank K. Stehle.
Charles A. Keffer.
BY
Wedersheim Fairbanks.
ATTORNEYS

UNITED STATES PATENT OFFICE.

FRANK K. STEHLE AND CHARLES A. KEFFER, OF PHILADELPHIA, PENNSYLVANIA.

PISTON-RING.

1,353,082.　　　Specification of Letters Patent.　Patented Sept. 14, 1920.

Application filed June 11, 1920. Serial No. 388,096.

*To all whom it may concern:*

Be it known that we, FRANK K. STEHLE and CHARLES A. KEFFER, both citizens of the United States, residing in the city and county of Philadelphia, State of Pennsylvania, have invented a new and useful Piston-Ring, of which the following is a specification.

Our invention relates to a novel construction of a piston ring, said ring being used as a packing ring for the pistons of steam engines, automobile engines, pumps, air compressors and other devices driven by steam, explosive gases, compressed air or the like, our novel ring being particularly adapted to the pistons of internal combustion engines, wherein it is well-known that it is necessary to produce sudden high compression and then efficiently to confine a body of the very hot gases produced by explosion under excessively high pressure, it being further desirable to avoid any excess of lubricating oil, being subjected to the interior burning gases. It is further well-known that piston rings which are capable of lateral expansion or have gaps to open or leak and that overheat and pump oil, are objectionable and cause piston trouble wherever tightness and a minimum friction are required between the piston and cylinder walls.

Our novel piston ring obviates the above disadvantages and is applicable to all piston grooves of any motor and perfect cylinder contact is assured by equal expansion of the whole ring against all points in the cylinder, said ring possessing all the wearing qualifications essential to the perfect performance of a motor, since there is a proper overlapping of the juxtaposed ring ends both in the plane of the ring and in a radial direction, which overlapping continues for a very considerable expansion of the ring, so that a large amount of wear may take place and the ring open up accordingly before it will be possible for the motive fluid to pass across the plane of the ring and thus leak out of that portion of the cylinder in which it is required to be retained.

To the above ends our invention consists of a novel construction of a piston ring, which consists in preferably first forming outer side cuts, an outer central recess and an outer central alining tongue in the outer periphery of the piston ring blank or body, next forming on the opposite inner peripheral portion of said ring, inner side cuts, an inner central recess and an inner central alining tongue, next cutting off the ends of said tongues, so as to increase the area of the contiguous lapped joint, and lastly, manually or mechanically breaking, fracturing or cracking the ring at a point in proximity to said cuts, whereby an expansible ring is produced and the central inner and outer tongues and central inner and outer recesses will tend to aline and interlock under all conditions of use, thereby preventing the ring from improper distortion during expansion and contraction, whereby a novel piston ring is formed, which is practically leak proof and capable and efficient under all conditions and which will by reason of its capability for expansion and contraction readily accommodate itself to the bore of the coacting cylinder, according to requirements.

For the purpose of illustrating our invention, we have shown in the accompanying drawings forms thereof which are at present preferred by us, since they will give in practice satisfactory and reliable results, although it is to be understood that the various instrumentalities of which our invention consists can be variously arranged and organized and that our invention is not limited to the precise arrangement and organization of these instrumentalities as herein shown and described.

Similar numerals of reference indicate corresponding parts.

Figure 1:
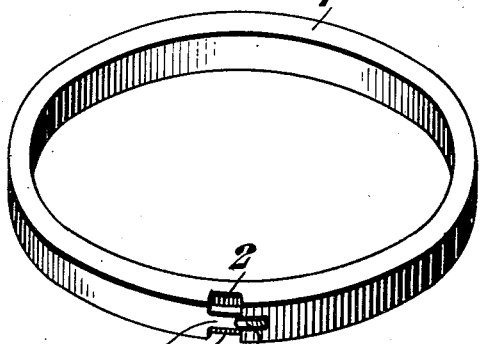
Figure 1 represents a perspective view of a solid piston ring blank or body showing the first step in the manner of making the same, in accordance with our invention.

Referring to the drawings:

In carrying out the steps of our invention, we first take a solid piston ring blank or body 1, which may be cast or otherwise produced out of suitable metal and which is elliptical to such a degree that when the material is removed that forms the joint to be hereinafter referred to, the ring compresses forming a true circle with enough material on the circumference thereof to allow finishing to the proper size.

In carrying out the first step in manufacturing our novel joint, the ring is secured in a suitable fixture and two end milling cutters working preferably in the same alinement opposing each other are used to produce the two outer side cuts 2 seen in Fig. 1.

By means of another end mill, we form the central slot or groove 3 seen in Fig. 1, the ring being revolved a suitable distance, thereby forming simultaneously the side grooves or slots 2 and the central groove or slot 3, whereby the central outer tongue 4 seen in Fig. 1 is produced.

The second step in the operation is accomplished without removing the ring from its holder, the ring being suitably manipulated, so that its inner periphery assumes such a position, that two end mills also placed in the same alinement opposing each other are fed in to such a depth as to form the inner side slots 5 and the intermediate inner central tongue 6.

Figure 2:
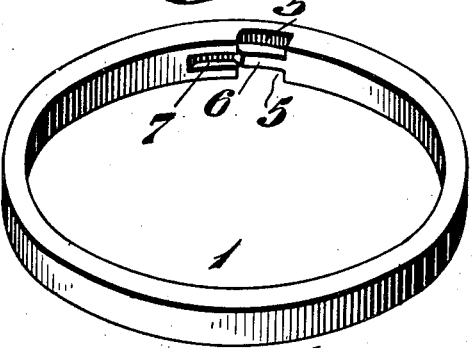
Fig. 2 represents a piston ring, blank or body similar to Fig. 1 but showing the second step of forming the inner cuts, central recess and tongue in our method of making the same.
Figure 9:
Fig. 9 represents a plan view similar to the bottom of Fig. 3 but showing the juxtaposed ends of the finished ring sprung apart.

The third step in the operation is the formation of the central groove or slot 7 seen in Fig. 2, which may be done either by an end mill working at right angles to the circumference or by a circular milling cutter working parallel to the axis of the ring, this groove 7 seen in Fig. 2 being of such a width and depth as to allow the free entrance of the tongue 6 when the ring parts or cracks automatically or mechanically, after the aforesaid slots and tongues are formed, said cracking or fracturing of the ring occurring at this stage.

Figure 10:
Fig. 10 represents a plan view of the finished ring with the ends sprung apart showing the internal tongue and groove and its adjuncts.
Figure 7:
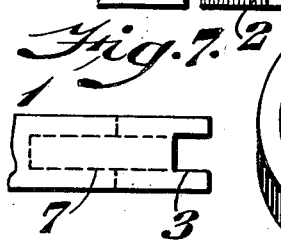
Fig. 7 represents a plan view of the left-hand bottom or outer portion of Fig. 3.
Figure 3:
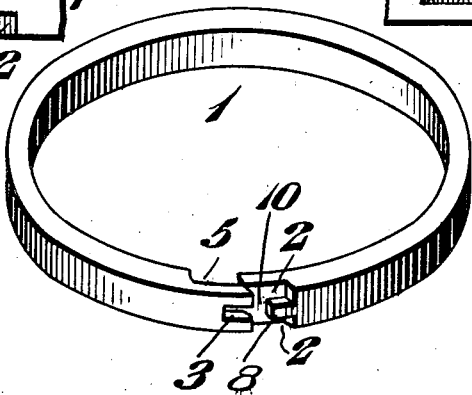
Fig. 3 represents a perspective view of the finished ring with the end of the outer tongue cut off, showing the general appearance of the ring preparatory to fracturing or cracking the same.
Figure 8:
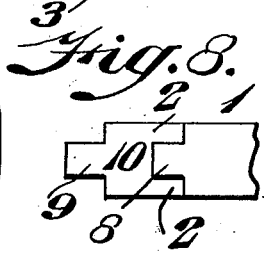
Fig. 8 represents an outside plan view of the right-hand bottom portion of Fig. 3, the ring being slightly sprung apart, so as to show particularly the relative position of the inner and outer tongues with respect to each other.
Figure 4:
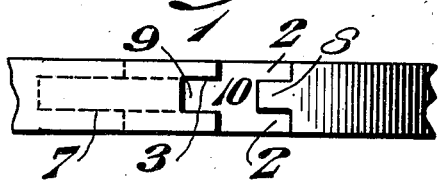
Fig. 4 represents a plan view of the outer periphery of Fig. 3.
Figure 5:
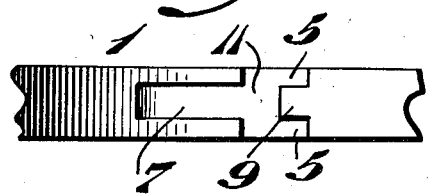
Fig. 5 represents a plan view of the inner periphery of Fig. 3, showing the inner tongue with its end cut off.
Figure 6:
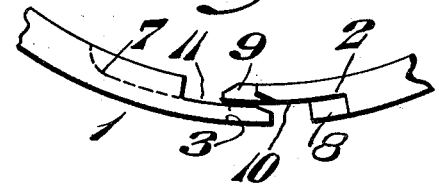
Fig. 6 represents a side elevation of a portion of the finished ring.

The next step is the removal of sufficient metal from the end of the projecting sides of the slot 3 and tongue 4 so that the tongue 4 has its end cut off and now appears as indicated at 8 in Figs. 3, 4, 6, 8 and 9, whereby the extent of the surface or area around said tongue 8 is increased to such an extent as to form a tight lap. The end of the tongue 6 is also cut off so that it now appears as indicated at 9 in Figs. 5, 6, 8, 9 and 10, so that it will be apparent that when the ring is compressed, it will assume substantially the shape of a circle and the outer tongue 8 will enter the outer central groove 3, and the inner tongue 9 will enter the inner central groove 7 and that a lap joint will be formed of considerable area by reason of the provision of the outer solid surface 10, see Figs. 3, 4, 8 and 9, and the inner solid surface 11, see Figs. 5, 6 and 10, it being apparent that said surfaces or areas 10 and 11 constituting the lap joint are formed by the cutting off of the ends of the tongues 4 and 6 seen in Figs. 1 and 2, said tongues in the finished ring appearing as seen at 8 and 9 respectively in Figs. 3, 4, 5, 6, 8, 9 and 10.

The last operation consists in compressing the ring until the juxtaposed ends of the ring composing the joint meet and overlap, the inner and outer tongues entering the inner and outer central grooves, the ring being then placed on an arbor and held compressed in any suitable manner and then ground or otherwise machined on the outer circumference to the size required.

While held in this closed condition a finishing cut is applied to the periphery of the ring and it is turned or ground to a true cylinder so as to have a diameter slightly less than that of the cylinder in which the piston travels. The ring is then inserted into the piston groove provided for it and the piston fitted to the cylinder; the ring will thereupon expand so as to accurately engage said cylinder peripherally at all points.

It will be seen that, when the piston ring is in place on the piston, and in the cylinder, there is a perfect overlapping of ring ends both as respects a radial direction and as respects the plane of the ring, which continues for a very considerable expansion of the ring so that a large amount of wear may take place, and the ring open up accordingly, before it will be possible for the other motive fluid to pass across the plane of the ring and thus leak out of that portion of the cylinder in which it is required to be retained.

By the foregoing operation, an efficient packing ring of the expansion type will be produced, whose free ends are capable by reason of the inner and outer central tongues and grooves so as to form a close fitting locking joint which will prevent the escape of gases or oil therethrough, the juxtaposed ends of the rings overlapping so as to provide an efficient lapped joint, which is completely closed under all working conditions of the ring.

We are aware of the patent to Smith, #1,181,618, wherein it has been proposed to employ an outer tongue and an inner elongated tongue in a piston ring, said tongues fitting in juxtaposed slots which extend completely through the body of the ring, but our invention is differentiated therefrom by the provision of the lapping areas 10 and 11, which are co-extensive with the width of the ring and are produced by cutting off the ends of the tongues 4 and 6 seen in Figs. 1 and 2 herein, in the manner described, it being apparent that in our device, the tongues and the grooves extend about half way through the body of the ring and that a very efficient lap joint is formed by reason of the provision of the lapped areas 10 and 11, which is completely closed under all working conditions of the ring.

It will be apparent from the foregoing that our novel rings made of more or less resilient metal and adapted to be sprung over a piston and into the grooves surrounding the piston, will produce a fluid tight fit at all times by reason of their pressing outwardly so as to hug the inner surface of the cylinder in which the piston reciprocates and that this tight fit will be preserved by the expansion of the rings to compensate for wear within the cylinder without an opening of the joint formed between the juxtaposed ends of the ring, whereby the fluid under pressure in our device cannot find its way past the ring.

In manufacturing our novel ring above described, it is not essential that the steps above described should be carried out in the order referred to, since it will be apparent that the operation shown in Fig. 2 may be performed first and the operation shown in Fig. 1 performed secondly, but in practice, we prefer to perform the steps of our operation in the sequence hereinabove described.

It will now be apparent that we have devised a novel and useful piston ring which embodies the features of advantage enumerated as desirable in the statement of the invention and the above description, and while we have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

What we do claim as our invention and desire to secure by Letters Patent, is:—

1. As a new article of manufacture, a piston ring having an outer tongue, an inner tongue projecting beyond said outer tongue, and an outer area 10 between said tongues and co-extensive with the width of said ring, said ring having inner and outer grooves, coacting with said tongues and an inner area 11 co-extensive with the width of said ring, said areas forming a lapped joint when the ring is compressed and said tongues and grooves interlocked.

2. As a new article of manufacture, a piston ring having an outer central tongue, an inner central tongue projecting beyond said outer tongue, and an outer area 10 between said tongues and co-extensive with the width of said ring, said ring having inner and outer central grooves, coacting with said tongues and an inner area 11 co-extensive with the width of said ring, said areas forming a lapped joint when the ring is compressed and said tongues and grooves interlocked.

3. As a new article of manufacture, a piston ring having an outer central tongue 8, an inner central tongue 9, and the outer area 10 between said tongues and co-extensive with the width of said ring, said ring having an outer central groove 3 in alinement with said tongue 8, and an inner central groove 8, out of alinement with said groove 3 but in alinement with said tongue 9, the inner periphery of said ring having the area 11 co-extensive with the width of the ring between said grooves 7 and 3, and said areas forming a lapped joint when the ring is compressed and the tongues and grooves interlocked.

FRANK K. STEHLE.
CHARLES A. KEFFER.

Witnesses:
E. HAYWARD FAIRBANKS,
C. D. McVAY.